(12) United States Patent
Ishida

(10) Patent No.: US 8,879,436 B2
(45) Date of Patent: Nov. 4, 2014

(54) MULTIBAND WIRELESS APPARATUS

(75) Inventor: Kaoru Ishida, Kanagawa (JP)

(73) Assignee: Panasonic Corporation, Osaka (JP)

( * ) Notice: Subject to any disclaimer, the term of this patent is extended or adjusted under 35 U.S.C. 154(b) by 332 days.

(21) Appl. No.: 13/380,094

(22) PCT Filed: Apr. 14, 2010

(86) PCT No.: PCT/JP2010/002697
§ 371 (c)(1),
(2), (4) Date: Dec. 22, 2011

(87) PCT Pub. No.: WO2011/004525
PCT Pub. Date: Jan. 13, 2011

(65) Prior Publication Data
US 2012/0093044 A1 Apr. 19, 2012

(30) Foreign Application Priority Data
Jul. 10, 2009 (JP) ................................. 2009-163805

(51) Int. Cl.
*H04J 3/00* (2006.01)
(52) U.S. Cl.
USPC ............................... 370/280; 370/328; 455/83
(58) Field of Classification Search
None
See application file for complete search history.

(56) References Cited

U.S. PATENT DOCUMENTS

| | | | |
|---|---|---|---|
| 2008/0070514 A1* | 3/2008 | Totsuka et al. | 455/82 |
| 2008/0151797 A1* | 6/2008 | Camp | 370/311 |
| 2011/0286368 A1* | 11/2011 | Kuriyama et al. | 370/277 |
| 2012/0236766 A1* | 9/2012 | Haralabidis et al. | 370/280 |

FOREIGN PATENT DOCUMENTS

| | | |
|---|---|---|
| JP | 10-504698 | 5/1998 |
| WO | 96/06490 | 2/1996 |
| WO | 2007/100169 | 9/2007 |

OTHER PUBLICATIONS

International Search Report issued Jun. 8, 2010 in corresponding International Application No. PCT/JP2010/002697.
Hiroshi Harada, "Cognitive Wireless Technology", [Online], Feb. 27, 2008, Ubiquitous ITS Symposium, [searched on Jun. 19, 2009], Internet <URL: http://www.itsforum.gr.jp/Public/J3Schedule/P20/3harada.pdf>, pp. 1-46 (with partial English translation).

* cited by examiner

*Primary Examiner* — Mohammad Adhami
(74) *Attorney, Agent, or Firm* — Wenderoth, Lind & Ponack, L.L.P.

(57) ABSTRACT

Provided is a multiband wireless apparatus that, even if the number of supported frequency bands increases, suppresses increase in the number of components, and completes cell search within a specified time. In a multiband wireless apparatus (1), a reception channel to which a current reception channel is going to be next switched is set in advance for one of a tunable duplexer (13) and a reception dedicated tunable filter (14) that is not connected to an antenna. An antenna switch (15), in a normal transmission/reception mode, connects the antenna to the tunable duplexer (13), and in a compressed mode, switches the connection of the antenna between the tunable duplexer (13) and the reception dedicated tunable filter (14).

4 Claims, 8 Drawing Sheets

F I G. 1
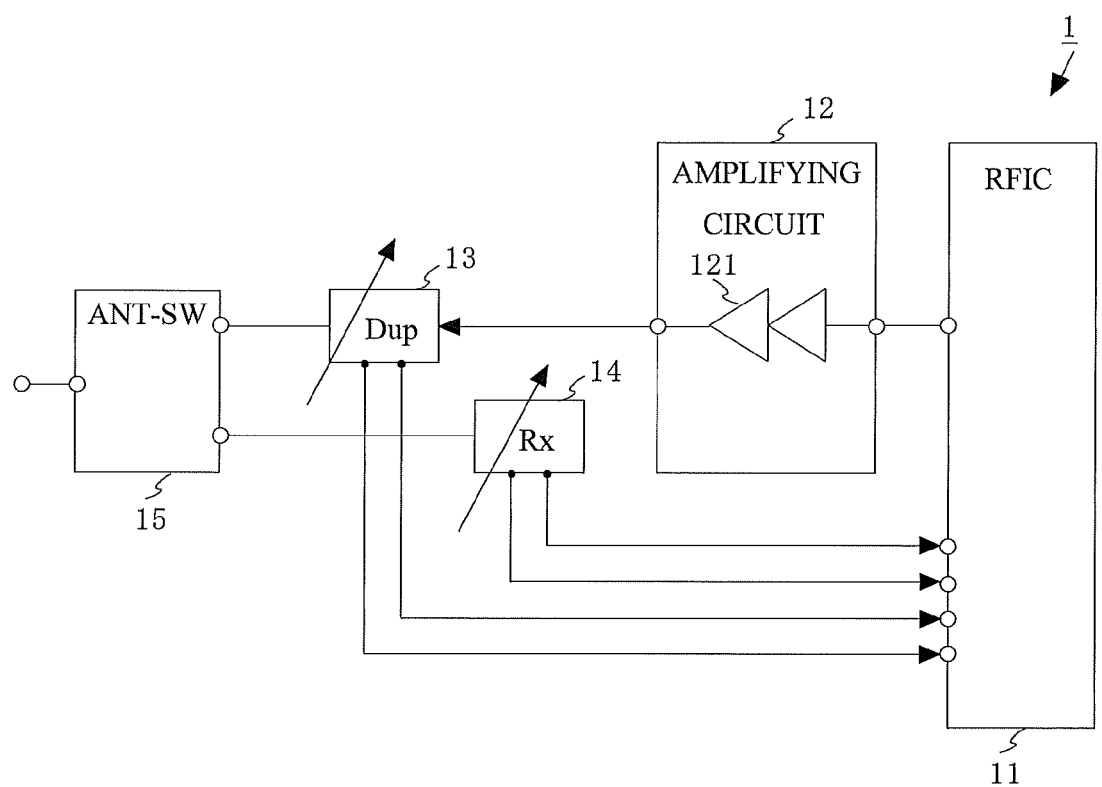

MULTIBAND WIRELESS APPARATUS

TECHNICAL FIELD

The present invention relates to a multiband wireless apparatus used in a mobile phone, a wireless LAN, or the like, and more particularly, to a multiband wireless apparatus that, even if the number of supported frequency bands increases, suppresses increase in the number of components, and completes cell search within a specified time.

BACKGROUND ART

Along with development of a UMTS (Universal Mobile Telecommunications System), the number of supported frequency bands has been increasing. Conventionally, in order for the UMTS to support a plurality of frequency bands, it is necessary to provide a plurality of power amplifiers (PA) and a plurality of duplexers (Dup) in accordance with the number of the plurality of frequency bands. It is noted that the UMTS includes a W-CDMA, a TD-CDMA, and the like. FIG. 6 is a block diagram showing the configuration of a conventional multiband wireless apparatus 50 as described above. As shown in FIG. 6, the conventional multiband wireless apparatus 50 includes: an RFIC 51; an amplifying circuit 52 including a plurality of power amplifiers (PA) connected in parallel; a plurality of duplexers (Dup) corresponding to the respective power amplifiers; and an antenna switch (ANT-SW) 54. Here, for the purpose of simplifying the description, FIG. 7 shows a simplified configuration of the multiband wireless apparatus 50, which is obtained by, in FIG. 6, decreasing each of the number of the power amplifiers and the number of the duplexers to two.

FIG. 7 is a simplified diagram showing a part of the configuration of the conventional multiband wireless apparatus 50 shown in FIG. 6. As shown in FIG. 7, the multiband wireless apparatus 50 includes: the RFIC 51; two power amplifiers 521 and 522 connected in parallel; two duplexers 531 and 532 corresponding to the respective power amplifiers 521 and 522; and the antenna switch 54. A control section (not shown) switches the connection of the antenna switch 54 between the duplexer 531 and the duplexer 532 in accordance with a frequency band to be supported, thereby switching a power amplifier and a duplexer to be used, between the power amplifiers 521 and 522 and between the duplexers 531 and 532. However, in the conventional multiband wireless apparatus 50, there is a problem that along with increase in the number of supported frequency bands, the number of components such as power amplifiers and duplexers increases, and thereby the circuit scale increases.

Then, in response to the increase in the UMTS bands, there has been taken an approach of using a wideband PA and a tunable duplexer capable of switching its band to a desired frequency, to reduce the number of parallel transmission circuits, thereby suppressing the increase in the number of components (see, for example, Non-Patent Literature 1). FIG. 8 is a block diagram showing the configuration of a conventional multiband wireless apparatus 60 disclosed in Non-Patent Literature 1. As shown in FIG. 8, the conventional multiband wireless apparatus 60 includes: an RFIC 61; an amplifying circuit 62 including a wideband PA 621; and a tunable duplexer 63. Thus, the conventional multiband wireless apparatus 60 uses the wideband PA 621 and the tunable duplexer 63 in response to the increase in the UMTS bands, thereby suppressing the increase in the number of components.

CITATION LIST

Non Patent Literature

[NPL 1] Hiroshi Harada, "Cognitive Wireless Technology", [Online], Feb. 27, 2008, Ubiquitous ITS Symposium, [searched on Jun. 19, 2009], Internet <URL: http://www.itsforum.gr.jp/Public/J3Schedule/P20/3harada.pdf>

SUMMARY OF THE INVENTION

Problems to be Solved by the Invention

In order to perform handover among base station cells in mobile communications, the multiband wireless apparatus 50 needs to execute a function, called a compressed mode, of stopping normal reception and transmission during a certain interval and searching for an unused channel by switching a reception frequency at high speed (hereinafter, referred to as cell search). The cell search needs to be completed within a time specified by the system. For example, the cell search is required to be completed within a short time of about 666 μsec. In order to realize such cell search, the conventional multiband wireless apparatus 50 switches the connection of the antenna switch 54, thereby switching the reception mode of the RFIC 51 (active RF block or frequency setting of synthesizer) at high speed.

On the other hand, since the conventional multiband wireless apparatus 60 does not have an antenna switch, in cell search, the conventional multiband wireless apparatus 60 needs to switch the frequency of the tunable duplexer 63, thereby switching the reception mode of the RFIC 61 (active RF block or frequency setting of synthesizer) at high speed. However, unlike mere switching of an antenna switch, in the switching of the frequency of the tunable duplexer 63, it is necessary to accurately adjust the frequency, and therefore, the response time is needed. Therefore, there is a problem that the cell search might not be completed within a specified time.

Therefore, an object of the present invention is to solve the above conventional problems and provide a multiband wireless apparatus that, even if the number of supported frequency bands increases, suppresses increase in the number of components, and completes cell search within a specified time.

Solution to the Problems

The present invention is directed to a multiband wireless apparatus supporting a plurality of frequency bands. In order to achieve the above object, a multiband wireless apparatus according to the present invention comprises: an RFIC for generating a transmission signal and processing a reception signal; a wideband PA for amplifying the transmission signal; a tunable duplexer for outputting the transmission signal amplified by the wideband PA to an antenna, and for outputting the reception signal received via the antenna to the RFIC; a reception dedicated tunable filter for outputting the reception signal received via the antenna to the RFIC; and an antenna switch for switching the connection of the antenna between the tunable duplexer and the reception dedicated tunable filter. A reception channel to which a current reception channel is going to be next switched is set in advance for one of the tunable duplexer and the reception dedicated tunable filter that is not connected to the antenna. In a normal transmission/reception mode, the antenna switch connects the antenna to the tunable duplexer. In a compressed mode, the antenna switch switches the connection of the antenna between the tunable duplexer and the reception dedicated tunable filter.

In addition, in the multiband wireless apparatus, the frequency range supported by the tunable duplexer and the frequency range supported by the reception dedicated tunable filter may be each divided into a plurality of ranges. In this case, the multiband wireless apparatus comprises: a plurality of the tunable duplexers that support the respective divided frequency ranges; a plurality of the wideband PA that correspond to the respective tunable duplexers; and a plurality of the reception dedicated tunable filters that support the respective divided frequency ranges.

In addition, the frequency range supported by the tunable duplexer and the frequency range supported by the reception dedicated tunable filter may be each divided into a plurality of ranges in accordance with the heights of frequencies.

In addition, the multiband wireless apparatus may further comprise: at least one TDMA wideband PA for amplifying the transmission signal; and at least one TDMA transmission filter for outputting the transmission signal amplified by the at least one TDMA wideband PA to the antenna.

Advantageous Effects of the Invention

As described above, the multiband wireless apparatus of the present invention includes the tunable duplexer and the wideband PA, thereby suppressing increase in the number of components even if the number of supported frequency bands increases. In addition, in the cell search, the antenna switch switches the connection of the antenna between the tunable duplexer and the reception dedicated tunable filter, while a reception channel to which the current channel is going to be switched is set in advance for one of the tunable duplexer and the reception dedicated tunable filter that is not connected to the antenna switch (i.e., the antenna). In this way, in the cell search, a time taken for switching the reception channel to a desired one is reduced, and therefore, it becomes possible to complete the cell search within a specified time.

BRIEF DESCRIPTION OF THE DRAWINGS

FIG. 1 is a block diagram showing an example of the configuration of a multiband wireless apparatus 1 according to the first embodiment of the present invention.

MODE FOR CARRYING OUT THE INVENTION

First Embodiment

Figure 2:
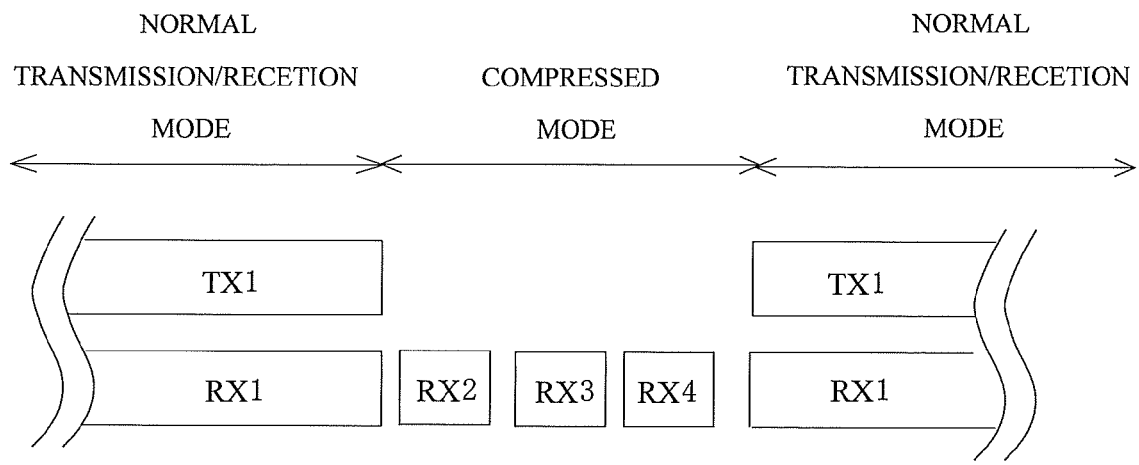
FIG. 2 is a diagram showing an example of operation in cell search in a compressed mode.

FIG. 1 is a block diagram showing an example of the configuration of a multiband wireless apparatus 1 according to the first embodiment of the present invention. As shown in FIG. 1, the multiband wireless apparatus 1 supports a UMTS, and includes: an RFIC 11; an amplifying circuit 12 including a wideband PA 121; a tunable duplexer (Dup) 13 corresponding to the wideband PA 121; a reception dedicated tunable filter 14; and an antenna switch (ANT-SW) 15.

The RFIC 11 generates a transmission signal, and processes a reception signal. In the amplifying circuit 12, the wideband PA 121 amplifies the transmission signal generated by the RFIC 11. A desired transmission channel and a desired reception channel are set for the tunable duplexer 13 by a control section (not shown). The tunable duplexer 13 outputs the transmission signal amplified by the wideband PA 121 to the antenna switch 15, and outputs a reception signal received via the antenna switch 15 to the RFIC 11. A desired reception channel is set for the reception dedicated tunable filter 14 by the control section, and the reception dedicated tunable filter 14 outputs a reception signal received via the antenna switch 15 to the RFIC 11. The antenna switch 15 switches the connection of an antenna (not shown) between the tunable duplexer 13 and the reception dedicated tunable filter 14. The control section may be provided in the RFIC 11, or may be provided separately.

In order to perform handover among base station cells in mobile communications, the multiband wireless apparatus 1 needs to execute a function, called a compressed mode, of stopping normal reception and transmission during a certain interval and searching for an unused channel by switching a reception frequency at high speed (that is, cell search). FIG. 2 is a diagram showing an example of operation in the cell search in the compressed mode. In FIG. 2, the multiband wireless apparatus 1 uses a transmission channel TX1 and a reception channel RX1, in a normal transmission/reception mode. The multiband wireless apparatus 1 activates the compressed mode prior to handover. In the compressed mode, the multiband wireless apparatus 1 executes the cell search in which the multiband wireless apparatus 1 searches for an unused channel, switching the reception channel to RX2, RX3, and RX4 in this order.

When the multiband wireless apparatus 1 has completed the search for an unused channel, the multiband wireless apparatus 1 ends the compressed mode and returns to the normal transmission/reception mode, to use the transmission channel TX1 and the reception channel RX1. Thereafter, the multiband wireless apparatus 1 executes handover, by using the unused channel found in the cell search. It is noted that operation in the execution of handover is not essential for the present invention, and therefore, the description thereof is omitted. The cell search needs to be completed within a time specified by the system. For example, the cell search is required to be completed within a short time of about 666 μsec. In addition, in the present example, since the reception channel is switched to RX2, RX3, and then RX4 in the cell search, it is required that the reception channel is switched in a short time of about 200 μsec per one channel in the search for an unused channel. It is noted that the number and the order of the reception channels to be searched for are not limited to the above example but may be arbitrarily decided.

Hereinafter, operation of the multiband wireless apparatus 1 in the cell search will be described in detail with reference to FIG. 1 and FIG. 2. In the normal transmission/reception mode, the antenna switch 15 is connected to the tunable duplexer 13. In addition, the transmission channel and the reception channel of the tunable duplexer 13 are set at TX1 and RX1, respectively.

First, prior to the cell search, the control section sets in advance the reception channel of the reception dedicated tunable filter 14 at RX2, in the normal transmission/reception mode. Next, the control section switches the antenna switch 15 to the reception dedicated tunable filter 14, when the cell search is started. In this way, immediately after the cell search is started, the multiband wireless apparatus 1 can operate the reception dedicated tunable filter 14 and switch the reception channel to RX2 in a short time. In addition, at this time, the control section sets, at RX3, the reception channel of the tunable duplexer 13 which is not connected to the antenna switch 15 (i.e., the antenna).

Next, when the search with the reception channel RX2 has been completed, the control section switches the connection of the antenna switch 15 to the tunable duplexer 13. In this way, immediately after the search with the reception channel RX2 is completed, the multiband wireless apparatus 1 can operate the tunable duplexer 13 and switch the reception channel to RX3 in a short time. In addition, at this time, the control section sets, at RX4, the reception channel of the reception dedicated tunable filter 14 which is not connected to the antenna switch 15 (i.e., the antenna).

Next, when the search with the reception channel RX3 has been completed, the control section switches the connection of the antenna switch 15 to the reception dedicated tunable filter 14. In this way, immediately after the search with the reception channel RX3 is completed, the multiband wireless apparatus 1 can operate the reception dedicated tunable filter 14 and switch the reception channel to RX3 in a short time. In addition, at this time, the control section sets, at RX1, the reception channel of the tunable duplexer 13 which is not connected to the antenna switch 15 (i.e., the antenna).

Next, when the search with the reception channel RX3 has been completed, the control section switches the connection of the antenna switch 15 to the reception dedicated tunable filter 14. In this way, immediately after the search with the reception channel RX3 is completed, the multiband wireless apparatus 1 can operate the reception dedicated tunable filter 14 and switch the reception channel to RX4 in a short time. In addition, at this time, the control section sets, at RX1, the reception channel of the tunable duplexer 13 which is not connected to the antenna switch 15 (i.e., the antenna).

As described above, the multiband wireless apparatus 1 according to the first embodiment of the present invention includes the tunable duplexer 13 and the wideband PA 121, thereby suppressing increase in the number of components even if the number of supported frequency bands increases. In addition, in the cell search, the antenna switch 15 switches the connection of the antenna between the tunable duplexer 13 and the reception dedicated tunable filter 14, while a reception channel to which the current channel is going to be switched is set in advance for one of the tunable duplexer 13 and the reception dedicated tunable filter 14 that is not connected to the antenna switch 15 (i.e., the antenna). In this way, in the cell search, a time taken for switching the reception channel to a desired one is reduced, and therefore, it becomes possible to complete the cell search within a specified time.

Second Embodiment

Figure 3:
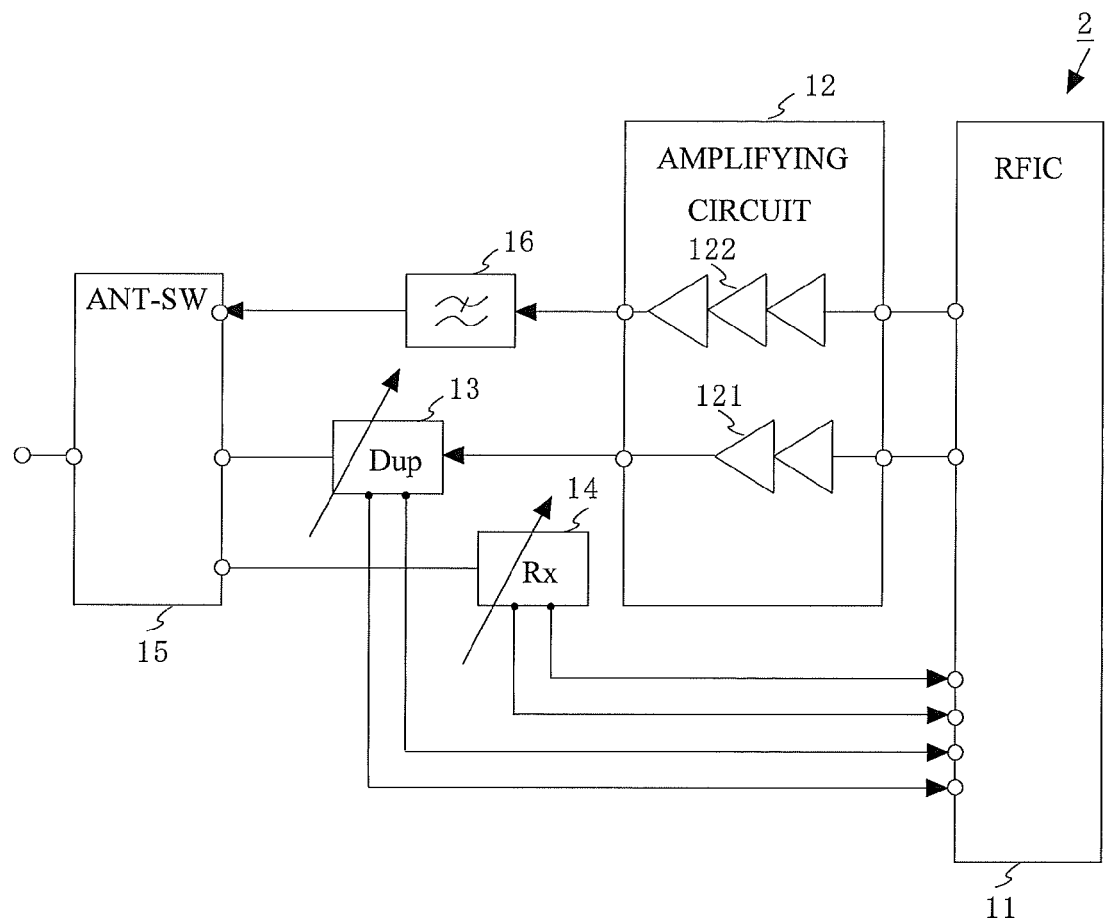
FIG. 3 is a block diagram showing an example of the configuration of a multiband wireless apparatus 2 according to the second embodiment of the present invention.

A multiband wireless apparatus 2 according to the second embodiment has a feature that the multiband wireless apparatus 2 supports both the UMTS and a TDMA (Time Division Multiple Access), in comparison with the multiband wireless apparatus 1 according to the first embodiment. In the present embodiment, a GSM (Global System for Mobile Communications) is supported as the TDMA. FIG. 3 is a block diagram showing an example of the configuration of the multiband wireless apparatus 2 according to the second embodiment of the present invention. As shown in FIG. 3, in comparison with the multiband wireless apparatus 1 of the first embodiment, the multiband wireless apparatus 2 further includes a GSM (TDMA) wideband PA 122 and a GSM (TDMA) transmission filter 16 as a transmission route for the GSM (TDMA). The antenna switch 15 switches the connection of the antenna among the tunable duplexer 13, the reception dedicated tunable filter 14, and the GSM transmission filter 16. In GSM transmission, the control section switches the connection of the antenna switch 15 to operate the GSM wideband PA 122 and the GSM transmission filter 16.

In the UMTS, prior to the cell search, the control section sets in advance the reception channel of the reception dedicated tunable filter 14 at RX2, in the normal transmission/reception mode. Next, the control section switches the antenna switch 15 to the reception dedicated tunable filter 14, when the cell search is started. In this way, immediately after the cell search is started, the multiband wireless apparatus 2 can operate the reception dedicated tunable filter 14 and switch the reception channel to RX2 in a short time. In addition, at this time, the control section sets, at RX3, the reception channel of the tunable duplexer 13 which is not connected to the antenna switch 15 (i.e., the antenna). The subsequent operation is the same as in the first embodiment, and therefore the description thereof is omitted.

As described above, the multiband wireless apparatus 2 according to the second embodiment of the present invention can support both the UMTS and the TDMA system such as the GSM, besides providing the same effect as in the first embodiment.

Third Embodiment

Figure 4:
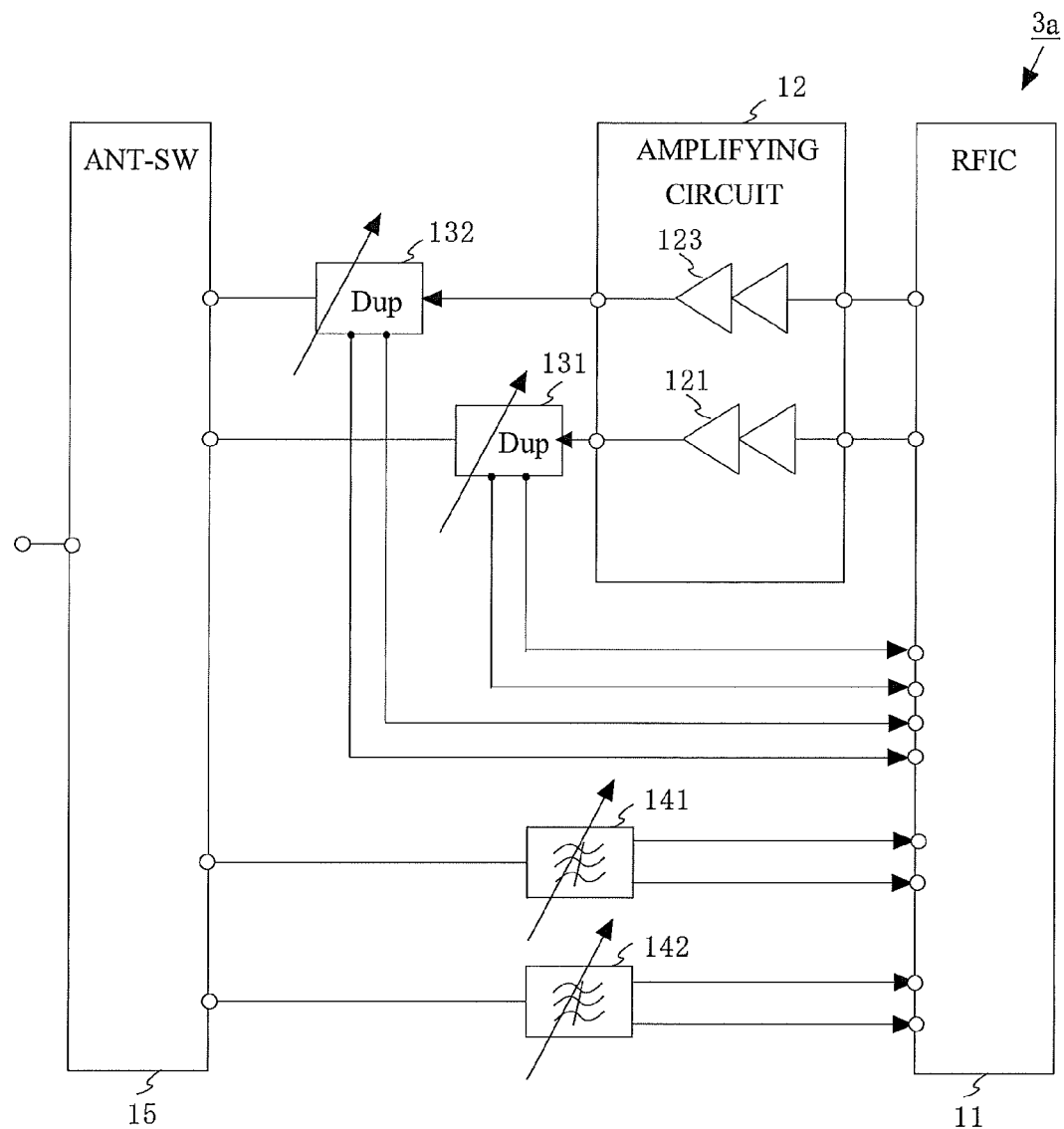
FIG. 4 is a block diagram showing an example of the configuration of a multiband wireless apparatus 3a according to the third embodiment of the present invention.

A multiband wireless apparatus according to the third embodiment has a feature that the frequency range of the tunable duplexer 13 and the frequency range of the reception dedicated tunable filter 14 are each divided into a plurality of ranges, in comparison with the multiband wireless apparatuses 1 and 2 according to the first and the second embodiments. FIG. 4 is a block diagram showing an example of the configuration of a multiband wireless apparatus 3a according to the third embodiment of the present invention. In the multiband wireless apparatus 3a shown in FIG. 4, as an example, the frequency range of the tunable duplexer 13 and the frequency range of the reception dedicated tunable filter 14 of the multiband wireless apparatus 1 of the first embodiment are each divided into two ranges. It is noted that the division number of the frequency range is not limited to two but the frequency range may be divided into any number of ranges.

As shown in FIG. 4, the multiband wireless apparatus 3a includes the RFIC 11, the first wideband PA 121, a second wideband PA 123, a first tunable duplexer 131, a second tunable duplexer 132, a first reception dedicated tunable filter 141, a second reception dedicated tunable filter 142, and the antenna switch 15. In the present embodiment, the frequency range supported by the multiband wireless apparatus 3a is divided into two ranges in accordance with the heights of the frequencies. The first wideband PA 121, the first tunable duplexer 131, and the first reception dedicated tunable filter 141 deal with the low frequency range. The second wideband PA 123, the second tunable duplexer 132, and the second reception dedicated tunable filter 142 deal with the high frequency range.

In the normal transmission/reception mode with the low frequency range, the multiband wireless apparatus 3a uses the transmission channel TX1 and the reception channel RX1, and in the compressed mode with the low frequency range, the multiband wireless apparatus 3a searches for an unused channel, switching the reception channel to RX2, RX3, and RX4 in this order. On the other hand, in the normal transmission/reception mode with the high frequency range, the multiband wireless apparatus 3a uses the transmission channel TX5 and the reception channel RX5, and in the cell search, the multiband wireless apparatus 3a switches the reception channel to RX6, RX7, and RX8 in this order.

It is noted that whether to operate the multiband wireless apparatus 3a in the low frequency range or the high frequency range may be determined by the control section comparing the frequency of the transmission channel or the reception channel with a predetermined threshold value, or by the control section referring to a look-up table (LUT) or the like.

First, operation in the low frequency range will be described. In operation in the low frequency range, in the normal transmission/reception mode, the antenna switch 15 is connected to the first tunable duplexer 131. In addition, the transmission channel and the reception channel of the first tunable duplexer 131 are set at TX1 and RX1, respectively. Prior to the cell search, the control section sets in advance the reception channel of the first reception dedicated tunable filter 141 at RX2, in the normal transmission/reception mode.

Next, the control section switches the antenna switch 15 to the first reception dedicated tunable filter 141, when the cell search is started. In this way, immediately after the cell search is started, the multiband wireless apparatus 3a can operate the first reception dedicated tunable filter 141 and switch the reception channel to RX2 in a short time. In addition, at this time, the control section sets, at RX3, the reception channel of the first tunable duplexer 131 which is not connected to the antenna switch 15 (i.e., the antenna).

Next, when the search with the reception channel RX2 has been completed, the control section switches the connection of the antenna switch 15 to the first tunable duplexer 131. In this way, immediately after the search with the reception channel RX2 is completed, the multiband wireless apparatus 3a can operate the first tunable duplexer 131 and switch the reception channel to RX3 in a short time. In addition, at this time, the control section sets, at RX4, the reception channel of the first tunable duplexer 131 which is not connected to the antenna switch 15 (i.e., the antenna).

Next, when the search with the reception channel RX3 has been completed, the control section switches the connection of the antenna switch 15 to the first reception dedicated tunable filter 141. In this way, immediately after the search with the reception channel RX3 is completed, the multiband wireless apparatus 3a can operate the first reception dedicated tunable filter 141 and switch the reception channel to RX4 in a short time. In addition, at this time, the control section sets, at RX1, the reception channel of the first tunable duplexer 131 which is not connected to the antenna switch 15 (i.e., the antenna).

Next, when the search with the reception channel RX4 has been completed, the control section ends the compressed mode and switches the connection of the antenna switch 15 to the first tunable duplexer 131. In this way, immediately after the search with the reception channel RX4 is completed, the multiband wireless apparatus 3a can operate the first tunable duplexer 131 and return to the normal transmission/reception mode in a short time.

Next, operation in the high frequency range will be described. In operation in the high frequency range, in the normal transmission/reception mode, the antenna switch 15 is connected to the second tunable duplexer 132. In addition, the transmission channel and the reception channel of the second tunable duplexer 132 are set at TX5 and RX5, respectively. Prior to the cell search, the control section sets in advance the reception channel of the second reception dedicated tunable filter 142 at RX6, in the normal transmission/reception mode. Thereafter, in the cell search, the reception channels of the second tunable duplexer 132 and the second reception dedicated tunable filter 142 are set at RX7 and RX8 while the connection of the antenna switch 15 is alternately switched. The switching procedure is the same as in the case of the low frequency range, and therefore the description thereof is omitted.

Figure 5:
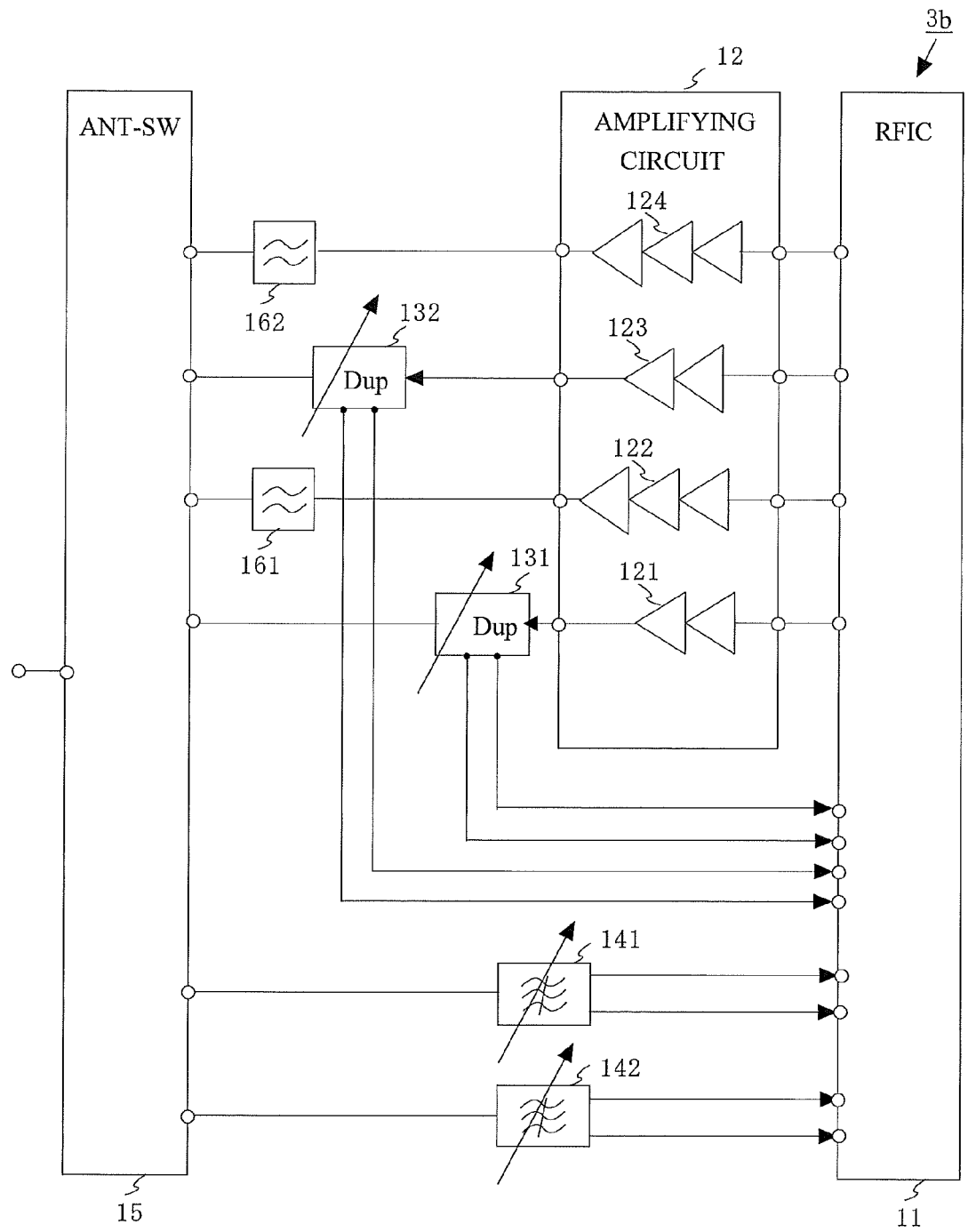
FIG. 5 is a block diagram showing an example of the configuration of a multiband wireless apparatus 3b according to the third embodiment of the present invention.

In addition, the multiband wireless apparatus according to the third embodiment may be applied to the second embodiment. FIG. 5 is a block diagram showing an example of the configuration of a multiband wireless apparatus 3b according to the third embodiment of the present invention. In the multiband wireless apparatus 3b shown in FIG. 5, as an example, the frequency range of the tunable duplexer 13 and the frequency range of the reception dedicated tunable filter 14 of the multiband wireless apparatus 2 of the second embodiment are each divided into two ranges. As shown in FIG. 5, in comparison with the multiband wireless apparatus 3a shown in FIG. 4, the multiband wireless apparatus 3b further includes the first GSM wideband PA 122, a second GSM wideband PA 124, a first GSM transmission filter 161, and a second GSM transmission filter 162 as a transmission route for the GSM.

The antenna switch 15 switches the connection of the antenna among the first tunable duplexer 131, the second tunable duplexer 132, the first reception dedicated tunable filter 141, the second reception dedicated tunable filter 142, the first GSM transmission filter 161, and the second GSM transmission filter 162. In GSM transmission, the control section switches the connection of the antenna switch 15 to operate the first GSM wideband PA 122 and the first GSM transmission filter 161, or to operate the second GSM wideband PA 124 and the second GSM transmission filter 162.

Operation of the multiband wireless apparatus 3b in the UMTS is the same as in the multiband wireless apparatus 3a, and therefore, the description thereof is omitted.

Figure 6:
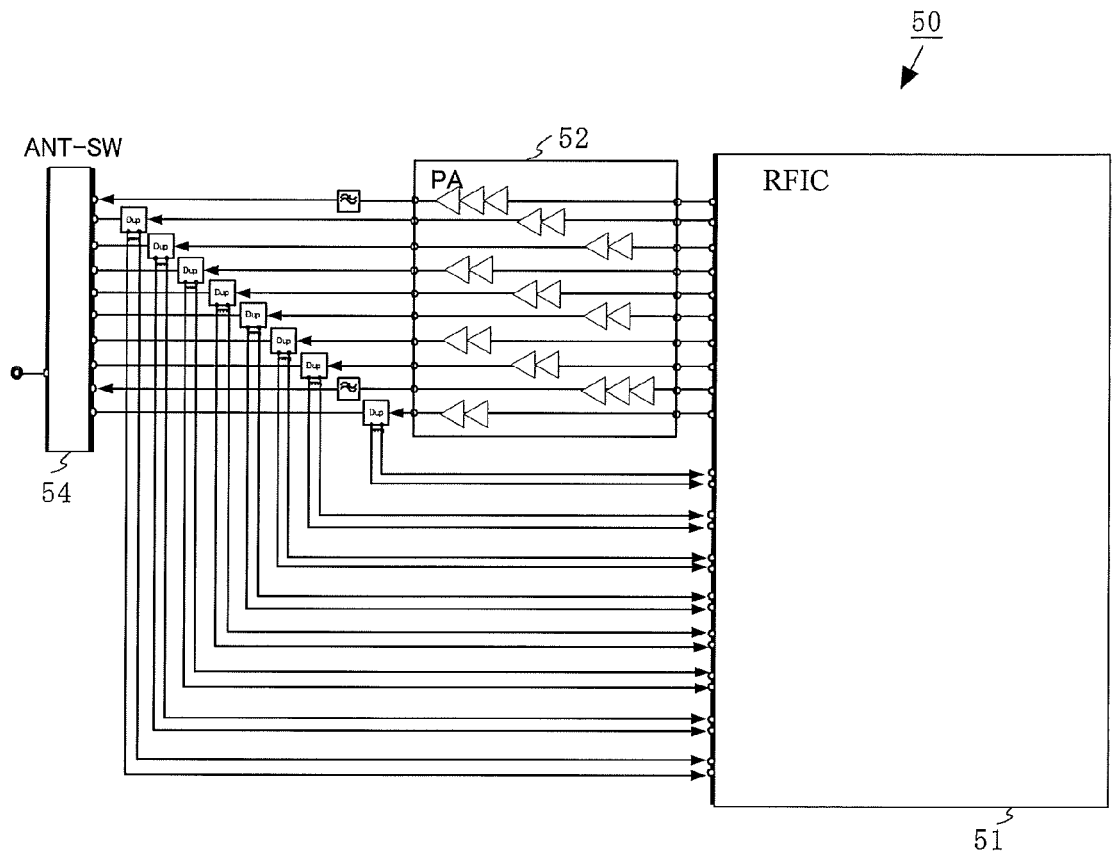
FIG. 6 is a block diagram showing the configuration of a conventional multiband wireless apparatus 50.
Figure 7:
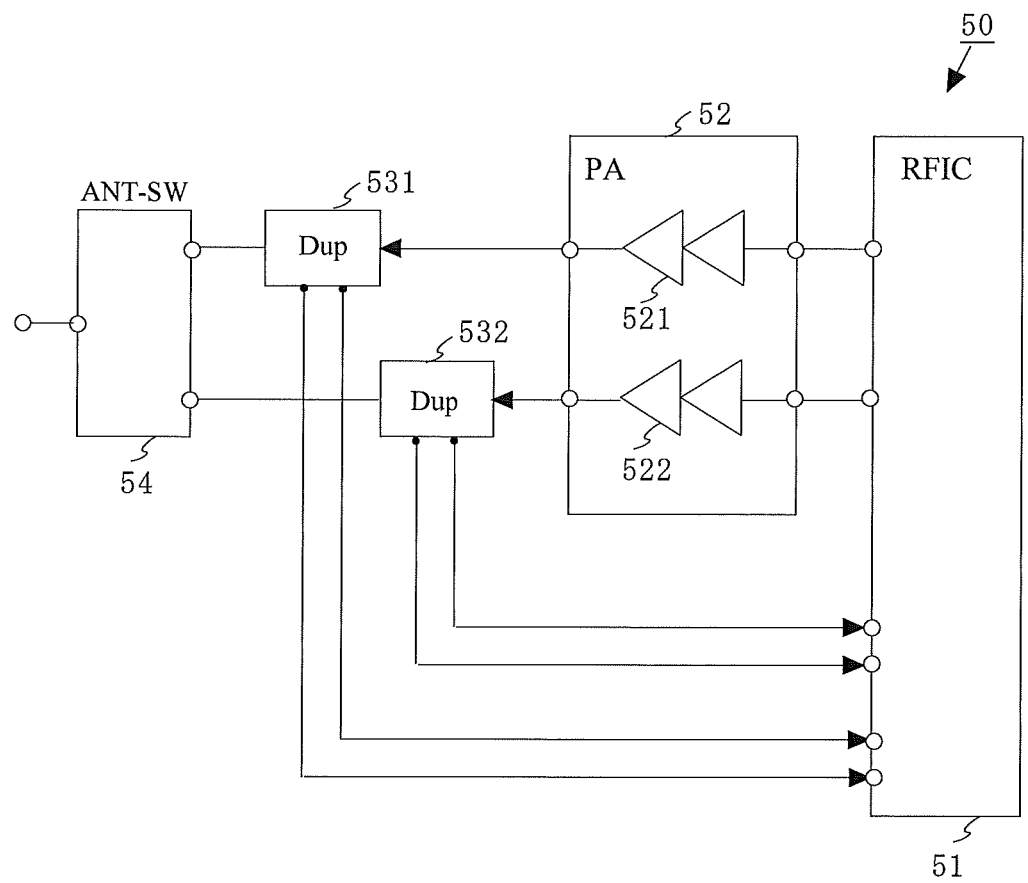
FIG. 7 is a diagram showing a simplified configuration of the conventional multiband wireless apparatus 50.
Figure 8:
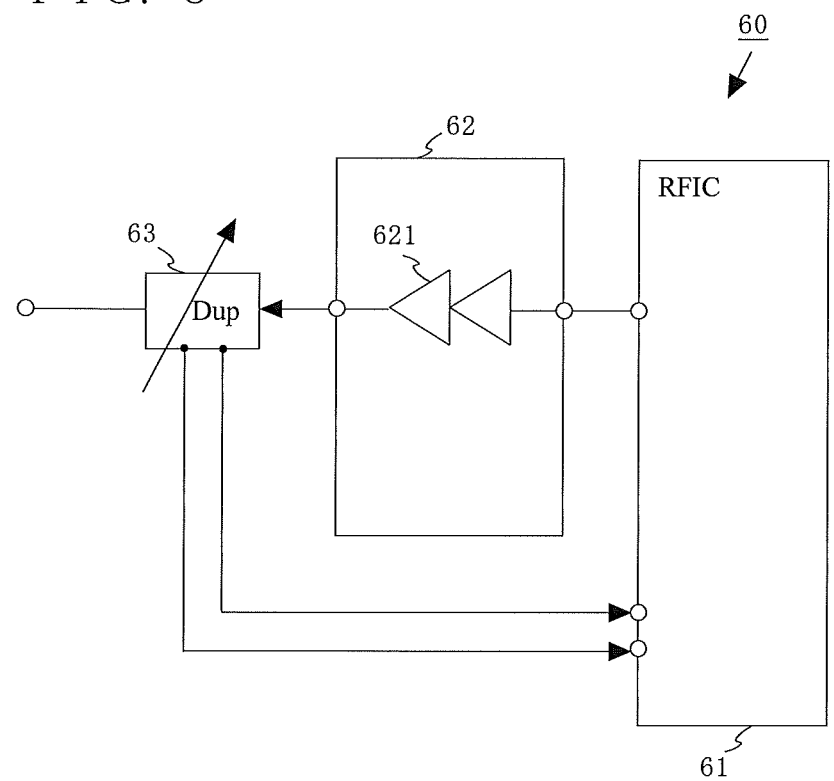
FIG. 8 is a block diagram showing the configuration of a conventional multiband wireless apparatus 60.

Next, suppression of increase in the number of components which is one of the effects of the present invention will be described, using the multiband wireless apparatus 3b shown in FIG. 5. The multiband wireless apparatus 3b includes the tunable duplexers 131 and 132 and the wideband PAs 121 and 123, thereby supporting the same number of frequency bands as the multiband wireless apparatus 50 shown in FIG. 6. In spite of this, in the multiband wireless apparatus 3b, the number of ports of the antenna switch 15 is reduced from ten to six, the number of pairs of reception ports of the RFIC 11 is reduced from eight to four, the number of output ports of the amplifying circuit 12 is reduced from ten to four, and the number of the tunable duplexers 131 and 132 is reduced from eight to two. Here, the reception dedicated tunable filters 141 and 142 are added as necessary components. However, as a whole, increase in the number of components is suppressed.

As described above, in comparison with the first and the second embodiments, in the multiband wireless apparatuses 3a and 3b according to the third embodiment of the present invention, the frequency ranges of the tunable duplexer and the reception dedicated tunable filter are each divided into a plurality of ranges, whereby it becomes possible to support a wider range of frequencies.

INDUSTRIAL APPLICABILITY

A multiband wireless apparatus of the present invention is applicable to, for example, communication apparatuses such as a mobile phone and a wireless LAN.

DESCRIPTION OF THE REFERENCE CHARACTERS 1 to 3 multiband wireless apparatus
11 RFIC
12 amplifying circuit
121, 123 wideband PA
122, 124 GSM wideband PA
13, 131, 132 tunable duplexer
14, 141, 142 reception dedicated tunable filter
15 antenna switch
16, 161, 162 GSM transmission filter

The invention claimed is:

1. A multiband wireless apparatus supporting a plurality of frequency bands, the multiband wireless apparatus comprising:
 a radio frequency integrated circuit (RFIC) for generating a transmission signal and processing a reception signal;
 a wideband power amplifier (PA) for amplifying the transmission signal;
 a tunable duplexer for outputting the transmission signal amplified by the wideband PA to an antenna, and for outputting the reception signal received via the antenna to the RFIC;
 a reception dedicated tunable filter for outputting the reception signal received via the antenna to the RFIC; and
 an antenna switch for alternately switching a connection of the antenna between the tunable duplexer and the reception dedicated tunable filter, so as to change receiving paths of the multiband wireless apparatus for receiving the reception signal, wherein
 a next reception channel is set in advance for one of the tunable duplexer and the reception dedicated tunable filter that is not connected to the antenna, and
 the antenna switch
 in a normal transmission/reception mode, connects the antenna to the tunable duplexer, and
 in a compressed mode, alternately switches the connection of the antenna between the tunable duplexer and the reception dedicated tunable filter, so as to change the receiving paths of the multiband wireless apparatus for receiving the reception signal,
 wherein the receiving paths of the multiband wireless apparatus include a first receiving path and a second receiving path,
 wherein the first receiving path includes the tunable duplexer so as to connect the antenna to the RFIC via the tunable duplexer,
 wherein the second receiving path includes the reception dedicated tunable filter so as to connect the antenna to the RFIC via the reception dedicated tunable filter,
 wherein, when the switch forms the first path to connect the tunable duplexer to the antenna, the second path is not formed and the reception dedicated tunable filter is not connected to the antenna,
 wherein, when the switch forms the second path to connect the reception dedicated tunable filter to the antenna, the first path is not formed and the tunable duplexer is not connected to the antenna,
 wherein the multiband wireless apparatus includes a plurality of reception channels,
 wherein two or more reception channels of the plurality of reception channels are connected to the tunable duplexer,
 wherein two or more reception channels of the plurality of reception channels are connected to the reception dedicated tunable filter, and
 wherein the next reception channel, which is set in advance for the one of the tunable duplexer and the reception dedicated tunable filter that is not connected to the antenna according to a state of the antenna switch, is one of the two reception channels connected to the one of the tunable duplexer and the reception dedicated tunable filter.

2. The multiband wireless apparatus according to claim 1, wherein a frequency range supported by the tunable duplexer and a frequency range supported by the reception dedicated tunable filter are each divided into a plurality of ranges, and
 the multiband wireless apparatus comprises:
 a plurality of the tunable duplexers that support respective divided frequency ranges of the frequency range supported by the tunable duplexer;
 a plurality of the wideband PA that correspond to respective tunable duplexers of the plurality of tunable duplexers; and
 a plurality of the reception dedicated tunable filters that support respective divided frequency ranges of the frequency range supported by the reception dedicated tunable filter.

3. The multiband wireless apparatus according to claim 2, wherein the frequency range supported by the tunable duplexer and the frequency range supported by the reception dedicated tunable filter are each divided into a plurality of ranges in accordance with heights of frequencies.

4. The multiband wireless apparatus according to claim 1, further comprising:
 at least one time division multiple access (TDMA) wideband PA for amplifying the transmission signal; and
 at least one TDMA transmission filter for outputting the transmission signal amplified by the at least one TDMA wideband PA to the antenna.

* * * * *